United States Patent
Wither

(10) Patent No.: US 10,028,245 B2
(45) Date of Patent: Jul. 17, 2018

(54) MAINTAINING POINT OF INTEREST DATA USING WIRELESS ACCESS POINTS

(71) Applicant: Samsung Electronics Co., Ltd., Gyeonggi-do (KR)

(72) Inventor: Jason R. Wither, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 294 days.

(21) Appl. No.: 14/333,432

(22) Filed: Jul. 16, 2014

(65) Prior Publication Data

US 2016/0019257 A1    Jan. 21, 2016

(51) Int. Cl.
| | | |
|---|---|---|
| H04W 60/00 | (2009.01) | |
| H04W 64/00 | (2009.01) | |
| H04W 4/02 | (2018.01) | |
| H04W 48/16 | (2009.01) | |
| G06F 17/30 | (2006.01) | |

(52) U.S. Cl.
CPC ........... *H04W 64/003* (2013.01); *H04W 4/02* (2013.01); *H04W 48/16* (2013.01); *G06F 17/3089* (2013.01)

(58) Field of Classification Search
None
See application file for complete search history.

(56) References Cited

U.S. PATENT DOCUMENTS

| | | | |
|---|---|---|---|
| 6,873,998 B1 | 3/2005 | Dorum et al. | |
| 7,751,971 B2 | 7/2010 | Chang et al. | |
| 8,126,476 B2 | 2/2012 | Vardi et al. | |
| 8,135,505 B2 | 3/2012 | Vengroff et al. | |
| 8,320,939 B1 | 11/2012 | Vincent | |
| 8,472,980 B2 | 6/2013 | Khorashadi et al. | |
| 8,483,711 B1 | 7/2013 | Mendis | |
| 8,521,128 B1 | 8/2013 | Welsh et al. | |
| 8,594,003 B2 | 11/2013 | Han et al. | |
| 9,510,154 B2 | 11/2016 | Mori et al. | |
| 2008/0171556 A1* | 7/2008 | Carter | H04W 4/023 455/456.1 |
| 2009/0125230 A1 | 5/2009 | Sullivan | |
| 2009/0281722 A1 | 11/2009 | Bitonti et al. | |

(Continued)

FOREIGN PATENT DOCUMENTS

| | | |
|---|---|---|
| CN | 103853740 A | 6/2014 |
| CN | 106461768 A | 2/2017 |

(Continued)

OTHER PUBLICATIONS

Xu, H. et al., "Balancing Privacy Concerns in the Adoption of Location-Based Services: an Empirical Analysis," In Journal of the American Society for Information Science and Technology, Jan. 2007, No. 58, pp. 157-165.

(Continued)

*Primary Examiner* — Jau-Shya Meng
(74) *Attorney, Agent, or Firm* — Cuenot, Forsythe & Kim, LLC

(57) ABSTRACT

Maintaining point of interest (POI) data using wireless access points (WAPs) includes correlating, using a processor, a WAP with a POI from a POI data store according to a network name and a location of the WAP and a name and a location of the POI. The POI data is updated according to the correlating.

20 Claims, 4 Drawing Sheets

(56) References Cited

U.S. PATENT DOCUMENTS

| | | | |
|---|---|---|---|
| 2009/0315775 | A1 | 12/2009 | Khosravy et al. |
| 2010/0023259 | A1 | 1/2010 | Krumm et al. |
| 2010/0198814 | A1 | 8/2010 | Petersen et al. |
| 2011/0046881 | A1 | 2/2011 | Karaoguz |
| 2011/0151898 | A1 | 6/2011 | Chandra et al. |
| 2011/0313779 | A1 | 12/2011 | Herzog et al. |
| 2012/0021762 | A1 | 1/2012 | Garin et al. |
| 2012/0041673 | A1 | 2/2012 | Douglas et al. |
| 2012/0102164 | A1 | 4/2012 | Gruen et al. |
| 2012/0102165 | A1 | 4/2012 | Gruen et al. |
| 2012/0130625 | A1 | 5/2012 | Srivastava |
| 2012/0130762 | A1 | 5/2012 | Gale et al. |
| 2012/0182933 | A1 | 7/2012 | Gandhakavi et al. |
| 2012/0184292 | A1 | 7/2012 | Lin et al. |
| 2012/0185458 | A1 | 7/2012 | Liu et al. |
| 2012/0226554 | A1 | 9/2012 | Schmidt et al. |
| 2012/0294532 | A1 | 11/2012 | Morris |
| 2012/0303556 | A1 | 11/2012 | Lin et al. |
| 2013/0023282 | A1 | 1/2013 | Lin et al. |
| 2013/0084859 | A1* | 4/2013 | Azar ................ H04W 48/08 455/435.1 |
| 2013/0084882 | A1 | 4/2013 | Khorashadi et al. |
| 2013/0084891 | A1 | 4/2013 | Khorashadi et al. |
| 2013/0090134 | A1* | 4/2013 | Heshmati .......... H04W 52/0245 455/456.3 |
| 2013/0097162 | A1 | 4/2013 | Corcoran et al. |
| 2013/0102283 | A1 | 4/2013 | Lau et al. |
| 2013/0122935 | A1 | 5/2013 | Das et al. |
| 2013/0137463 | A1 | 5/2013 | Busch |
| 2013/0201365 | A1 | 8/2013 | Wirola et al. |
| 2013/0204652 | A1 | 8/2013 | Marins et al. |
| 2013/0222369 | A1 | 8/2013 | Huston et al. |
| 2013/0267255 | A1 | 10/2013 | Liu et al. |
| 2013/0321466 | A1 | 12/2013 | Kocienda |
| 2013/0337830 | A1 | 12/2013 | Haro et al. |
| 2013/0339270 | A1 | 12/2013 | Singh |
| 2014/0278090 | A1* | 9/2014 | Boes ................ G01C 21/3476 701/533 |
| 2014/0310366 | A1* | 10/2014 | Fu ...................... H04L 51/04 709/206 |
| 2015/0113039 | A1* | 4/2015 | Laurikari ............ H04L 67/18 709/202 |
| 2015/0312722 | A1 | 10/2015 | Mori et al. |
| 2017/0041761 | A1 | 2/2017 | Mori et al. |

FOREIGN PATENT DOCUMENTS

| | | | |
|---|---|---|---|
| EP | 3139196 | A1 | 3/2017 |
| EP | 3170323 | A4 | 2/2018 |
| KR | 20150124396 | A | 11/2015 |
| KR | 20170031745 | A | 3/2017 |
| WO | 2012050948 | A1 | 4/2012 |
| WO | 2014077500 | A1 | 5/2014 |
| WO | 2016010224 | A1 | 1/2016 |

OTHER PUBLICATIONS

Steinfield, C., "The Development of Location Based Services in Mobile Commerce," In E-Life After the Dot Com Bust, Physica-Verlag HD, 2004, pp. 177-197.

Ratcliffe, J.H., "On the Aaccuracy of TIGER-type Geocoded Address Data in Relation to Cadastral and Census Areal Units," Int'l. Journal of Geographical Information Science, vol. 15, No. 5 pp. 473-485, 2001.

Wither, J., et al., "Moving Beyond the Map: Automated Landmark Based Pedestrian Guidance Using Street Level Panoramas," Proc. of 15th Int'l. Conf. on Human-Computer Interaction with Mobile Devices and Services, pp. 203-212, ACM, 2013.

Perez, S., "Foursquare Begins Crowdsourcing Local Business Data Collection With Questions That Appear After Check-Ins," [online] TechCrunch.com, Aug. 21, 2013 [retrieved Jul. 14, 2014] retrieved from the Internet: <http://techcrunch.com/2013/08/21/foursquare-begins-crowdsourcing-local-business-data-collection-with-questions-that-appear-after-check-ins/>, 6 pg.

"Report a problem or fix the Map," [online] Google, Inc. © 2014 [retrieved Jul. 14, 2014] retrieved from the Internet: <https://support.google.com/maps/answer/162873?hl=en>, 2 pg.

"A New Frontier for Google Maps: Mapping the Indoors," [online] Google Official Blog, Nov. 29, 2011 [retrieved Jul. 14, 2014] retrieved from the Internet: <http://googleblog.blogspot.com/2011/11/new-frontier-for-google-maps-mapping.html>, 9 pg.

"Bing Maps Publishes Equivalent of 100,000 DVD's of Bird's Eye Imagergy," [online] Bing Blogs, Microsoft © 2013 [retrieved Jul. 14, 2014] retrieved from the Internet: <https://web.archive.org/web/20140603110543/http://www.bing.com/blogs/site_blogs/b/maps/archive/2013/06/11/largest-shipment-of-bird-s-eye-100-000-dvds-of-imagery.aspx>, 4 pg.

Chon, Y., "Autonomous Place Naming System Using Opportunistic Crowdsensing and Knowledge From Crowdsourcing," In Proc. of 12th Int'l Conf. on Information Processing in Sensor Networks, pp. 19-30, ACM, 2013.

Rae, A. et al., "Mining the Web for Points of Interest," Proc. of 35th Int'l. ACM SIGIR Conf. on Research and Development in Information Retrieval, pp. 711-720, ACM, 2012.

Popescu, A. et al., "Towards Precise POI Localization with Social Media." In Proc. of 21st ACM Int'l. Conf. on Multimedia, pp. 573-576. ACM, 2013.

Jones, R.K. et al., "What Where Wi: An Analysis of Millions of Wi-Fi Access Points," In Proc. of Int'l. Conf. Portable Information Devices, May 2007, pp. 1-4.

Schutzberg, A.. "Microsoft Adds More Birds Eye View and Venue Data to Bing Maps; Offers Report a Problem Button," [online] All Points Blog Directions Magazine, Jun. 11, 2013 [retrieved Jul. 14, 2014] retrieved from the Internet: <http://apb.directionsmag.com/entry/microsoft-adds-more-birds-eye-view-and-venue-data-to-bing-maps-offers-repor/334347>, 5 pg.

WIPO Appln. No. PCT/KR2015/001301, International Search Report and Written Opinion, dated Jun. 8, 2015, 7 pg.

European Appln. No. EP150821739, Extended Search Report, dated Jan. 11, 2018, 7 pg.

\* cited by examiner

| WAP Data 110 | | | | |
|---|---|---|---|---|
| Record | Network Name | Timestamp | Location | Signal Level (optional) |
| 1 | Network ABC | Timestamp A | Location A1 | 50 |
| 2 | Network ABC | Timestamp B | Location A2 | 60 |

FIG. 3

| POI Data 115 | | |
|---|---|---|
| Record | Name | Location |
| 1 | Name C | Location C |
| 2 | Name ABC | Location D |

FIG. 4

| Chain Data 120 | | | | |
|---|---|---|---|---|
| Record | Chain Name | Branch Name | Branch Location | Network Name |
| 1 | Chain Name A | Branch Name A1 | Location X | Network Chain A |
| 2 | Chain Name A | Branch Name A2 | Location Y | Network Chain A |

FIG. 5

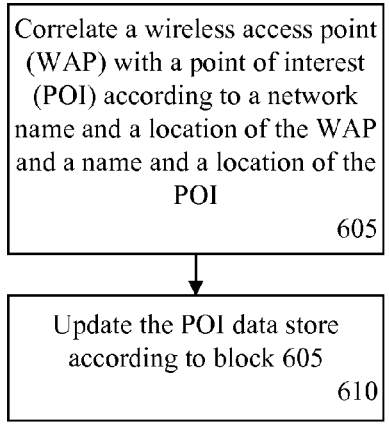
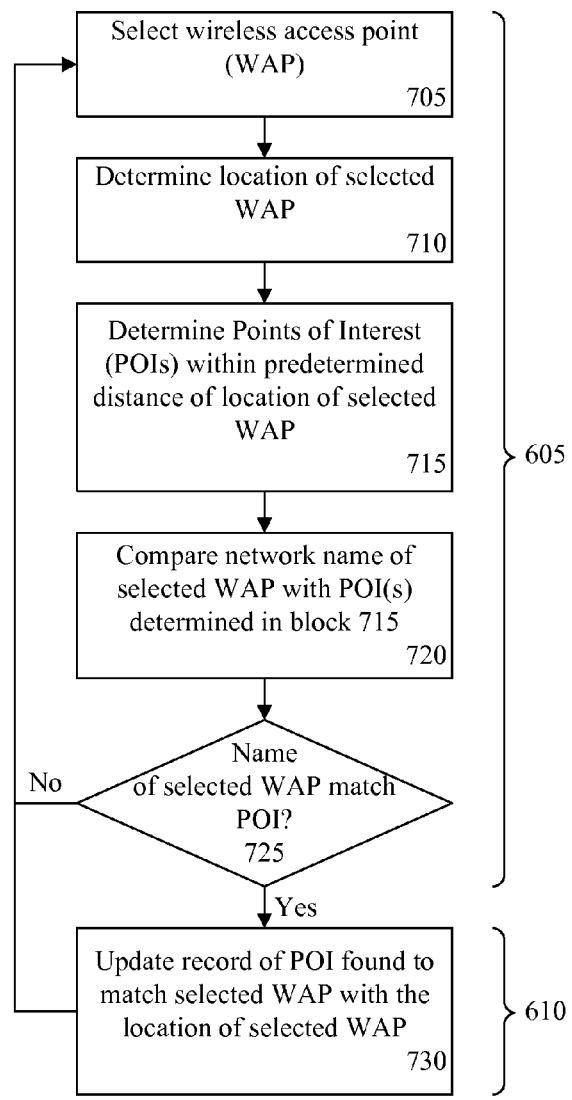
FIG. 6
FIG. 7

MAINTAINING POINT OF INTEREST DATA USING WIRELESS ACCESS POINTS

TECHNICAL FIELD

This disclosure relates to maintaining point of interest data using wireless access points.

BACKGROUND

A point of interest (POI) is a specific point location that one may find useful or interesting. Location-based services rely extensively on POIs. For example, within electronic maps, mapping applications, and/or navigation applications, POIs are displayed within a map view based upon the recorded location of each respective POI. Having accurate location data for POIs significantly improves the usefulness of a location-based service. Conversely, inaccurate POI data may lead to user frustration and/or abandonment of the service.

In some cases, available location information for POIs may be inaccurate. One example is that of a pedestrian only commercial area such as an indoor or outdoor shopping mall or plaza. Typically, the address of each establishment in a pedestrian only commercial area has a same street number. The suite number of each business may be the only differentiating aspect of the addresses. In that case, it is likely that two or more POIs located in a same commercial area may have same location information despite being located significant distances from one another.

A variety of different techniques may be used to improve the accuracy of POI data. Available techniques, however, tend to be manual, costly, and time consuming to implement.

SUMMARY

An embodiment includes a method. The method includes correlating, using a processor, a wireless access point (WAP) with a point of interest (POI) from a POI data store according to a network name and a location of the WAP and a name and a location of the POI. The method also includes updating the POI data store according to the correlating.

Another embodiment includes a system. The system includes a processor programmed to initiate executable operations. The executable operations include correlating a WAP with a POI from a POI data store according to a network name and a location of the WAP and a name and a location of the POI. The method also includes updating the POI data store according to the correlating.

Another embodiment includes a non-transitory processor-readable storage medium that includes program code. The program code, when executed by a processor, performs a method. The method includes correlating a WAP with a POI from a POI data store according to a network name and a location of the WAP and a name and a location of the POI. The method also includes updating the POI data store according to the correlating.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which:

FIG. 3 is a table illustrating exemplary wireless access point (WAP) data.

FIG. 4 is a table illustrating exemplary POI data.

FIG. 5 is a table illustrating exemplary chain data.

FIG. 6 is a flow chart illustrating an exemplary method of processing POI data.

FIG. 7 is a flow chart illustrating another exemplary method of processing POI data.

DETAILED DESCRIPTION

Figure 1:
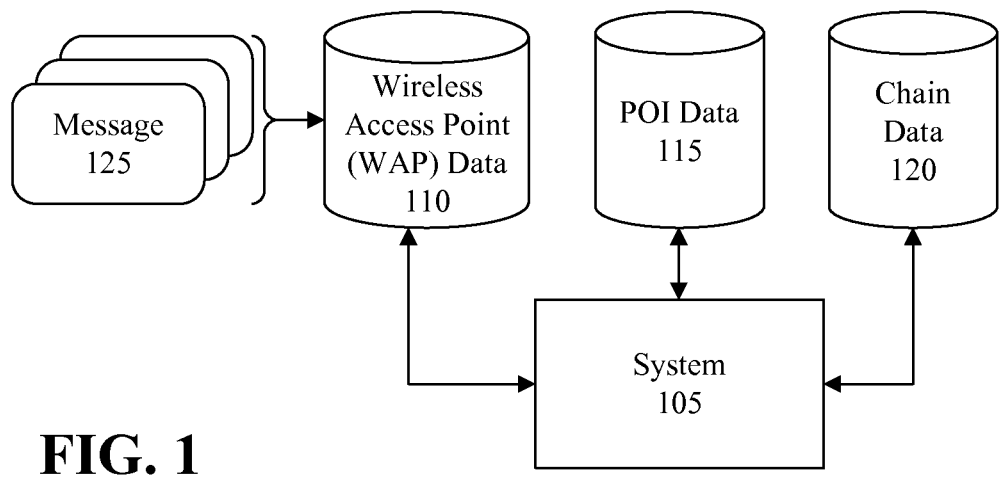
FIG. 1 is a block diagram illustrating an example of a point of interest (POI) system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to maintaining point of interest data using wireless access points. In accordance with the inventive arrangements described within this disclosure, point of interest data is maintained using locations of wireless access points. Wireless access point data is often updated based upon messages received from one or more wireless-enabled devices over time. In this regard, wireless access point data may be dynamically updated and, as such, considered more accurate than point of interest data, which may be more static. Thus, in one aspect, the location of an existing point of interest may be updated using the location of a wireless access point that is determined to match the POI based upon one or more established criteria. In another aspect, the location of a wireless access point may be used to create a new point of interest within the point of interest data. In still another aspect, a point of interest may be deleted from the point of interest data based upon the wireless access point data.

Several definitions that apply throughout this document now will be presented. As defined herein, the term "automatically" means without user intervention. As defined herein, the term "user" means a human being. As defined herein, the term "point of interest" or "POI" means a specific point location that one, i.e., a user, may find useful or interesting. POIs, as may be specified within a data store, are often used in conjunction with location-based services such as electronic maps, mapping applications, navigation applications, and the like.

As defined herein, the term "wireless access point" or "WAP" means a device that establishes wireless communications with one or more other wireless-enabled devices (wireless devices) thereby allowing the other wireless devices to connect to a wired network using a wireless local area networking (WLAN) technology. Examples of WLAN technologies used for communication between wireless devices and the WAP may include, but are not limited to, any of the IEEE 802.1x standards for wireless network communication. In one aspect, a WAP may be a standalone device that connects to a router through a wired connection. In another aspect a WAP may be included as a component within a router.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary system 105. In general, system 105 is configured to process and/or maintain POI data using locations of WAPs. In one aspect, system 105 is implemented as a data processing system, e.g., a computer system such as a server. System 105 is coupled to multiple data stores. As pictured, system 105 is coupled to a data store including WAP data 110, a data store including POI data 115, and a data store including chain data 120. For purposes of discussion, reference to a particular "data" such as WAP data 110, POI data 115, and/or chain data 120 within this disclosure also refers to the particular data store in which the data is stored. Further, in some cases, a data store may be referred to according to the type of data stored therein. For example, the data store storing WAP data may be referred to as the WAP data store, etc.

Each of the data stores may be implemented as a non-transitory, processor-readable storage medium. As such, each of the data stores may be included within one or more data processing systems, one or more network attached storage devices, combinations thereof, or the like. Within each data store, data may be stored in any of a variety of formats, including, but not limited to, tabular form, list form, in a database, or the like. While the various data stores are illustrated independently, in on aspect, the data stores may be included or combined into a fewer data stores than pictured. In another aspect, the data may be split or divided into more data stores than pictured in FIG. 1. Further, one or more or all of the illustrated data stores may be included within system 105.

System 105 communicates with each respective data store over a network. Appreciably, in the case where one or more of the data stores are within system 105, no network communication is needed. In any case, the network is the medium used to provide communication links between system 105 and the data stores shown. The network may include connections, such as wire, wireless communication links, or fiber optic cables. The network may be implemented as, or include, any of a variety of different communication technologies such as a wide area network (WAN), a local area network (LAN), a wireless network, e.g., a wireless LAN or WLAN, a mobile network, a Virtual Private Network (VPN), the Internet, the Public Switched Telephone Network (PSTN), or the like.

In one aspect, WAP data 110 includes a plurality of records. Each record, for example, may specify a network name of a WAP, a timestamp specifying a date or a date and time that the WAP was detected, and a location of the WAP. In one aspect, WAP data 110 may be crowd sourced.

In illustration, the location of a WAP may be determined using a global positioning system (GPS) of a wireless device responsive to detecting the WAP. In another aspect, the location of a WAP may be determined using other techniques such as triangulation or other indoor localization technology as determined by the wireless device responsive to detecting the WAP. One or more of such wireless devices send messages 125 to WAP data 110, or to another data processing system charged with managing or compiling WAP data 110. WAP data 110 may be compiled from received messages 125. For example, each message 125 from a wireless device may specify a network name of a WAP, or WAPs, detected by the wireless device, a timestamp indicating when the WAP was detected by the wireless device, and a location for the WAP. Received messages 125 may be stored within WAP data 110 as records specifying the aforementioned data.

POI data 115 includes a plurality of records. Each record may specify a particular POI, e.g., a name of the POI, and an associated location for the POI. In many cases, the location specified for the POI may not be highly accurate. For example, multiple, different POIs within a same shopping center each may have a same location within POI data 115. POI data 115 may include additional information such as a description of the POI, tag(s), keyword(s), telephone numbers, hours of operation, and the like.

Chain data 120 specifies a list of known chains. As defined within this disclosure, a "chain" is a legal entity such as a business or other establishment, whether for-profit or non-profit, having more than one branch. A "branch" is a physical place of the chain that conducts business or transactions with users or members of the public. Each branch of a chain operates under a common, or same, brand. Examples of chains include restaurants with multiple branches, conveniences stores with multiple branches, retail stores with multiple branches, etc. Chain data 120 may include a plurality of records. The records of chain data 120 may specify a chain name, known branches for the chain as identified by the chain name, a location for each branch, and a network name known to be used for WAPs located in the branches of each chain.

In operation, system 105 reads WAP data 110 and selects a WAP, e.g., a record from WAP data 110 specifying a particular WAP and associated location. System 105 determines the location of the WAP from the selected record. In some cases, system 105 may determine the last time that the WAP was detected based upon timestamps of records for the WAP. In general, system 105 compares the selected WAP with POI data 115 and selectively updates a POI, e.g., a record of a POI, within POI data 115. System 105 updates the a POI responsive to determining that the selected WAP matches the POI based upon various criteria. For example, the location of the POI may be updated to the location of the selected WAP. System 105 further may compare the selected WAP with chain data 120. Based upon an evaluation of the selected WAP with respect to chain data 120, system 105 may selectively update chain data 120 and/or POI data 115.

Figure 2:
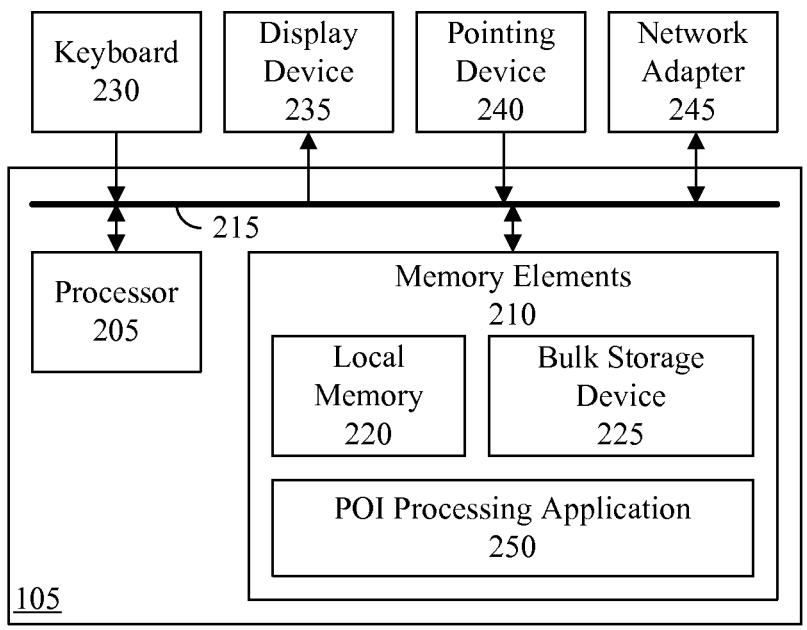
FIG. 2 is a block diagram illustrating an exemplary implementation of the POI system of FIG. 1.

FIG. 2 is a block diagram illustrating an exemplary implementation of system 105. System 105 may include at least one processor 205. As defined herein, the term "processor" means at least one hardware circuit configured to carry out instructions contained in program code. A processor is typically implemented as an integrated circuit. Examples of a processor include, but are not limited to, a central processing unit (CPU), an array processor, a vector processor, a digital signal processor (DSP), a field-programmable gate array (FPGA), an application specific integrated circuit (ASIC), and a controller.

Processor 205 is coupled to memory elements 210 through a system bus 215 or other suitable circuitry. As such, system 105 stores program code within memory elements 210. Processor 205 executes the program code accessed from memory elements 210 via system bus 215 or the other suitable circuitry.

In one aspect, system 105 is implemented as a computer or other programmable data processing apparatus that is suitable for storing and/or executing program code. It should be appreciated, however, that system 105 may be implemented in the form of any system including a processor and memory that is capable of performing and/or initiating the functions and/or operations described within this disclosure. Further, system 105 may be implemented in any of a variety of different form factors including, but not limited to, a portable computing device, a desktop computing device, a server, or the like.

Memory elements 210 include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 may be implemented as a hard disk drive (HDD), solid state drive (SSD), or other persistent data storage device. POI system 105 also may include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 optionally may be coupled to system 105. The I/O devices may be coupled to system 105 either directly or through intervening I/O controllers. One or more network adapters 245 may also be coupled to system 105 to enable system 105 to become coupled to other systems, computer systems, remote printers, and/or remote storage devices through intervening private or public networks. Modems, cable modems, wireless transceivers, and Ethernet cards are examples of different types of network adapters 245 that may be used with system 105.

As pictured in FIG. 2, memory elements 210 can store a POI processing application 250. POI processing application 250, being implemented in the form of executable program code, is executed by system 105 and, as such, is considered an integrated part of system 105. POI processing application 250, including any parameters and/or attributes utilized by POI processing application 250, e.g., WAP data 110, POI data 115, and/or chain data 120, are functional data structures that impart functionality when employed as part of system 105.

FIG. 3 is a table illustrating exemplary WAP data 110. For purposes of illustration, WAP data 110 includes two records. It should be appreciated that WAP data 110 may include more records than shown. The number of records included in WAP data 110 is not intended to be limiting of the inventive arrangements described herein. In the example of FIG. 3, each record of WAP data 110 includes an entry number, a network name, a timestamp, and a location. Records may optionally include a signal level.

In one aspect, the network name may be specified as a service set identifier (SSID) of the WAP. The SSID is a string that is often 1 to 32 bytes in length. The SSID is usually specified as a human readable string, but need not. The timestamp may specify a date or a date and a time at which the WAP identified by the network name is detected by a wireless device. The location may be specified as a GPS coordinate, e.g., as a latitude and a longitude.

In one aspect, WAP data 110 may include more than one record for each WAP as pictured. In illustration, the same WAP, e.g., "Network A Name," may be detected by more than one wireless device. Accordingly, WAP data 110 may include a record from each wireless device that detected the WAP. In cases where a WAP has more than one record, the signal level of a record may be used as a measure of accuracy of the location information of the record. For example, considering two records for a same WAP, the record with the higher, or stronger, signal level may be considered more accurate in terms of location of the WAP. System 105, for example, may select the record with the higher signal level, i.e., record 2, for processing over the record with the lower signal level, i.e., record 1. In one aspect, system 105 may ignore record 1. In another aspect, when multiple records exist for a same WAP, system 105 may purge or delete the records of lower signal level from WAP data 110, e.g., purge record 1.

In another aspect, system 105 may combine multiple records for a same WAP into a single record. In that case, for example, the location in the resulting record may be the location of the record with the highest signal level. In another example, the location of the resulting record may be determined by system 105 using triangulation or another localization technique using each of the plurality of records being combined. The resulting record, specifying a location determined from the locations of the multiple entries for the WAP, may be considered to be of greater accuracy. The records used to generate the resulting record may be purged from WAP data 110.

In still another aspect, when a WAP is specified in more than one record and records are either being purged or combined, the timestamp of the newest record may be preserved or otherwise added to the remaining or resulting record for the WAP. For example, system 105 may determine the record for the WAP with the newest, or most recent, timestamp and add that timestamp as a new data item to the remaining or resulting record.

In yet another aspect, the procedures described above with respect to selecting records according to signal level, purging, and/or merging multiple records, etc., may not be performed by system 105. Another system, for example, may be tasked with pre-processing WAP data 110. The other system may operate upon WAP data 110 to place WAP data 110 in condition for usage by system 105.

While each of records 1 and 2 of WAP data 110 are for a same WAP, each specifies a slightly different location. In the example of FIG. 3, the locations may differ since the location of the wireless devices detecting the WAP and generating the respective records may have been different as indicated, at least in part, by the differing signal levels.

FIG. 4 is a table illustrating exemplary POI data 115. For purposes of illustration, POI data 115 includes two records. It should be appreciated that POI data 115 may include more records than shown. The number of records included in POI data 115 is not intended to be a limitation of the inventive arrangements described herein. Each record of POI data 115 includes a record number, a name for a POI, and a location. The name is human readable name and the location may be specified as a GPS coordinate. As previously noted, POI data 115 may include more data items than illustrated such as a description or classification of each POI, and other supplemental information relating to the POI such as hours of operation, telephone number, Website address, or the like.

Consider an example in which system 105 selects record 2 of WAP data 110 for processing. System 105 may determine that the network name "Network ABC" matches the name of the POI indicated by entry 2 in POI data 115. As used herein, the term "matching" or "match" means that one item either exactly matches another item or partially matches, unless specified with particularity. A partial match means that at least a portion of an item matches at least a portion of another item. Two items may be said to match, at least partially or in part, responsive to determining matching strings, matching characters, matching combinations of characters, matching sequence(s) of characters, or the like. In this example, system 105 may match the string "ABC" between the network name of record 2 of WAP data 110 and the name of the POI in record 2 of POI data 115.

Further, system 105 may determine that location A2 of the WAP identified by "Network ABC" is within a predetermined distance of location D of the POI called "Name ABC." In that case, system 105 updates the location of entry 2 in POI data 115 to specify "Location A2" instead of "Location D." The location of the WAP is considered to be more accurate than the location initially stored for the POI called "Name ABC".

FIG. 5 is a table illustrating exemplary chain data 120. For purposes of illustration, chain data 120 includes two records. It should be appreciated that chain data 120 may include more records than pictured. The number of records illustrated is not intended to be a limitation. In the example of FIG. 5, each record of chain data 120 includes a record number, a chain name, a branch name, a branch location, and a network name. In one aspect, the network name may be specified as a complete network name, one or more strings that considered identifying of the network name, rules that are considered identifying of the network name, or the like.

For purposes of illustration, chain data 120 may include various strings and/or rules that may be used to correlate a network name of a WAP with a particular chain. The rules may specify a sequence of characters including wildcards, a plurality of strings in a specified order, etc. In other cases, a separate data store may be created with strings and/or rules that when matched to a network name of a WAP, correlate the WAP to a particular chain within chain data 120.

In general, the naming convention used for network names of WAPs installed at branches of chains may be determined in advance. While the network name of a WAP may be compared with the chain names of chain data 120 to determine a match, in another aspect, the network name of a WAP from WAP data 110 maybe compared with the network names of the records of chain data 120. As noted, the network names of chain data 120 may specify entire or complete network names of WAPs, strings, or other rules that may be matched to the network name of a WAP from WAP data 110. In the event that a network name of a WAP is determined to match a chain using the criteria described within this disclosure, additional chain-specific processing may be performed.

FIG. 6 is a flow chart illustrating an exemplary method 600 of processing POI data. Method 600 may be performed by a system as described with reference to FIG. 1. The system is coupled to a WAP data store and a POI data store.

Method 600 may begin in block 605 where the system correlates a WAP from the WAP data store with a POI from the POI data store. The WAP is correlated with the POI according to a network name and a location of the WAP and a name and a location of the POI. In block 610, the system updates the POI data store according to the correlation performed in block 605.

The updated POI data may be used in generating a map, determining or generating directions such as a route, navigation, or the like. For example, the system may generate a map in which POIs are positioned on the map in accordance with the updated POI data store. The map, and/or mapping data, may be determined or generated responsive to a received request from a remote computing system. The map, and/or map data, may be provided to, or sent, to a remote computing system for purposes of navigation, providing turn-by-turn directions, route generation, or the like. In still another aspect, the system may perform route generation, navigation, or other similar functions using the updated POI data store. The updated POI data included in the map data or placed upon an electronic map improves accuracy of navigation, route generation, and the accuracy of electronic mapping in general.

FIG. 7 is a flow chart illustrating an exemplary method 700 of processing POI data. Method 700 may be performed by a system as described with reference to FIG. 1. The system is coupled to a WAP data store and a POI data store. For purposes of illustration, the various blocks of FIG. 7 have been associated with corresponding blocks of FIG. 6.

Method 700 may begin in block 705 where the system selects a WAP from the WAP data within the WAP data store. The system, for example, selects a particular record from the WAP data. In one aspect, the WAP data may be pre-processed so that the system selects a record for a WAP, e.g., a "WAP record," where the WAP has a single record within the WAP data. In another aspect, the WAP data may include more than one entry for the WAP. In that case, the system may select the record for the WAP that specifies a highest signal level. In still another example, the system may merge two or more records into a single record specifying a single location and select the resulting record for processing.

In block 710, the system determines a location for the selected WAP. As noted, the record for the selected WAP specifies the location of the WAP.

In block 715, the system determines any POIs from the POI data within the POI data store that have a location within a predetermined distance of the location of the selected WAP. In one example, the predetermined distance may be 100 meters. In another example, the predetermined distance may be 200 meters. Other exemplary distances may include, but are not limited to, 150 meters, 250 meters, 300 meters, etc.

As discussed, the locations within the POI data are not considered to be highly accurate. Accordingly, the predetermined distance must be large enough to include POIs that, while not listed as having a same location as the selected WAP, are sufficiently close for consideration. The POI, for example, may be located within a same shopping mall or plaza as the WAP and, as such, merit consideration.

In block 720, the POI system compares the network name of the selected WAP with the names of the POIs determined in block 715. In block 725, the POI system determines whether the network name of the selected WAP matches a POI from those POIs determined in block 715. For example, the system compares the network name of the selected WAP with the name of the POIs determined in block 715. Responsive to determining that the network name matches a name of a POI determined in block 715, method 700 continues to block 730. Responsive to determining that the network name of the selected WAP does not match the name of a POI determined in block 715, method 700 loops back to block 705 to continue processing.

In block 730, the system updates the record of the POI found to match the selected WAP so that the record for the POI specifies the location of the selected WAP. As discussed, the locations in the WAP data are considered more accurate than the locations in the POI data. Locations within records of WAP data, for example, may be accurate within 10 meters, 15, meters, 20 meters, or the like, whereas variation in the POI locations are larger.

Figures 8, 9:
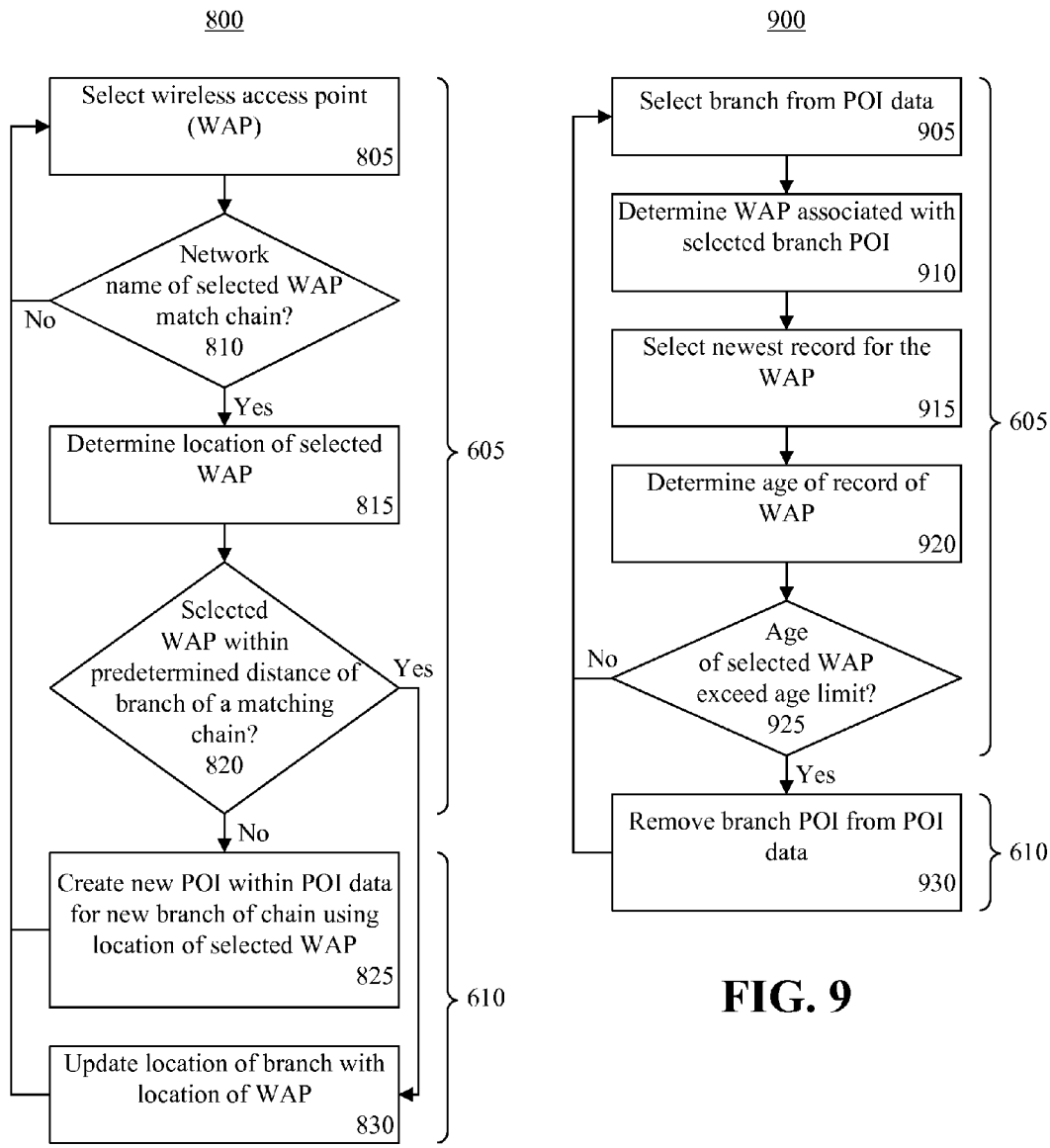
FIG. 8 is a flow chart illustrating an exemplary method of processing POI data for chains.
FIG. 9 is a flow chart illustrating another exemplary method of processing POI data for chains.

FIG. 8 is a flow chart illustrating an exemplary method 800 of processing POI data. Method 800 may be performed by a system as described with reference to FIG. 1. The system is coupled to a WAP data store, a POI data store, and a chain data store. Method 800 relates to chain processing and, more particularly, to the addition and/or updating of POIs using WAP data. For purposes of illustration, the various blocks of FIG. 8 have been associated with corresponding blocks of FIG. 6.

Method 800 may begin in block 805 where the system selects a WAP from the WAP data stored in the WAP data store. The system, for example, selects a particular entry from the WAP data specifying the selected WAP. In block 810, the system determines whether the network name of the selected WAP matches a chain. For example, the system determines whether the network name of the selected WAP matches a chain name and/or a network name of a chain from the chain data.

In block 815, the system determines the location of the selected WAP. As noted, the location is specified within the record of the selected WAP. In block 820, the system determines whether the selected WAP is located within a predetermined distance of a branch of the matching chain. If so, the branch of the chain is selected; and, method 800 continues to block 825. If not, method 800 proceeds to block 830.

In one aspect, the predetermined distance used in block 815 is the same as the predetermined distance used in method 700 of FIG. 7. The predetermined distance may be set to 100, 150, 200, 250, 300, etc., meters. In another aspect, however, the predetermined distance may be independent and different from the predetermined distance used in describing method 700 of FIG. 7.

In block 825, the system creates a new POI within the POI data. The new POI is a new branch of the chain. The name of the POI, for example, may be the chain name of the chain found to match in block 810. The location of the selected WAP is used as the location of the new POI. It should be appreciated that in block 825, the POI system also may update the chain data by adding a branch and location for the branch to the matching chain. After block 825, method 800 loops back to block 805 to select a next WAP and continue processing.

Continuing with block 830, the system updates the POI data for the branch determined in block 820. For example, the POI system updates the location of the POI specifying the branch in the POI data with the location of the selected WAP. Further, the system may update the location of the branch determined in block 820 within the chain data. After block 830, method 800 loops back to continue processing.

FIG. 9 is a flow chart illustrating another exemplary method 900 of processing POI data for chains. Method 900 may be performed by a system as described with reference to FIG. 1. The system is coupled to a WAP data store, a POI data store, and a chain data store. Method 900 relates to chain processing and, more particularly, to the removal of POIs using WAP data. For purposes of illustration, the various blocks of FIG. 9 have been associated with corresponding blocks of FIG. 6.

Method 900 may begin in block 905 where the system selects a branch from the POI data. In one aspect, the records stored within the POI data may indicate which records are branches of chains and which records are not. In another aspect, the system may cross-reference the chain data with the POI data to locate and select a particular branch of a chain that is a POI within the POI data. For purposes of discussion, a POI that is branch of a chain is referred to as a "branch POI."

In block 910, the system determines a WAP associated with the selected branch POI. In one aspect, the record for the branch POI may specify the particular WAP or record for a WAP associated with the branch POI that was previously used as the location of the selected branch POI. In another aspect, a WAP associated with the selected branch POI is one having a network name and a location matching, or corresponding to, the selected branch POI. In that case, for example, the system may search the WAP data for a WAP record having a network name matching the name of the chain of the POI branch and/or for a WAP record having a network name matching the network name for the chain of the POI branch. Further, in determining a WAP associated with the selected POI branch, the system determines whether the location of any WAP records with matching network names as described have locations within a predetermined distance of the location of the branch POI. In some cases, the location of a WAP may be an exact match for the location of the branch POI. Such may be the case where the located WAP record was previously used to update the location of the branch POI.

In one aspect, the predetermined distance used in block 910 is the same as the predetermined distance used in method 700 of FIG. 7. The predetermined distance may be set to 100, 150, 200, 250, 300, etc., meters. In another aspect, however, the predetermined distance may be independent and different from the predetermined distance used in describing method 700 of FIG. 7. Further, since the branch POI is assumed to be a high traffic area, the predetermined distance used in block 910 may be smaller than used in FIG. 7 or in FIG. 8. For example, the distance may be less than 100 meters, less than 50 meters, etc.

In block 915, the system determines the newest record for the WAP, or records of associated WAPs, determined in block 910. In some cases, for example, the WAP data may include more than one record for a WAP. In that case, in block 915, the system selects the newest, or most recently added, record for the WAP based upon the timestamp within the record. The timestamp may be the date and/or time that the WAP is detected by a wireless device and/or the data and/or time that the record for the WAP is created in the WAP data.

In block 920, the system determines the age of the record of the WAP determined in block 915. The system determines the age of the WAP using the timestamp of the record. The system determines the amount of elapsed time from the timestamp of the WAP record to the current date and/or time as the age of the selected WAP.

In block 925, the system determines whether the age of the selected WAP exceeds an age limit. If so, method 900 continues to block 930. If not, method 900 loops back to block 905 to continue processing. If the age of the selected WAP is less than the age limit, the system considers the selected WAP record to be up to date. The selected WAP record is younger than the oldest age allowed for a WAP record and considered accurate. If the timestamp of the selected WAP record is older than the age limit, the system considers the selected WAP record to be out of date. The selected WAP record is older than the maximum age allowed for a WAP record and is considered in accurate.

Such is the case since the particular WAP records being examined in FIG. 9 are for chains that under normal circumstances are detected with regularity by wireless devices. A WAP for a branch of a chain where the most recent WAP record is older than the age limit is considered inactive. In one example, the age limit may be 1 year, 8 months, 6 months, 4 months, etc. When the WAP of a branch of a chain is considered to be inactive, the system in turn determines that the branch for the chain is closed.

Accordingly, in block 930, responsive to determining that the selected WAP is older than the age limit, the system removes the branch POI selected in block 905 from the POI data. Further, the system removes the branch from the chain data. After block 930, method 900 loops back to block 905 to continue processing.

In one aspect, the various methods described within this disclosure may be performed as a single, unified method or as two methods. For example, method 700 may be combined with method 800 and method 900 and implemented as a single, larger method where redundant steps are eliminated. In another aspect, method 700 may be combined with method 800. In still another aspect, method 800 may be combined with method 900. For example, while processing POIs and/or WAP records, the system optionally may evaluate the age of WAP records determined to be associated with a branch POI. The various methods described may be performed from time-to-time, periodically, continually, or as needed for updating POI data and/or chain data. Further, the methods as described may be performed serially or concurrently, e.g., in separate threads of execution or as separate computational processes within one or more data processing systems.

In accordance with the inventive arrangements described herein, POI data may be maintained using locations of WAPs. In one aspect, responsive to a determination that a POI matches a WAP using established matching criteria, the location of the WAP is used to update the matching POI. In another aspect, new POIs may be created in cases where a WAP is found to match a chain and be located in a region where no branch for the chain is known to exist. In still another aspect, a branch of a chain may be deleted as a POI in the case where the only WAP within a predetermined distance of the branch was detected outside of a predetermined time span indicating that the WAP record is too old to be considered accurate.

For purposes of explanation, specific nomenclature is set forth to provide a thorough understanding of the various inventive concepts disclosed herein. The terminology used herein, however, is for the purpose of describing particular embodiments only and is not intended to be limiting. For example, reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements may also be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining," "responsive to determining," "in response to detecting," or "responsive to detecting" depending on the context. Similarly, the phrase "if it is determined" or "if [a stated condition or event] is detected" may be construed to mean "upon determining," "in response to determining," "responsive to determining," "upon detecting [the stated condition or event]," "in response to detecting [the stated condition or event]," or "responsive to detecting [the state condition or event]" depending on the context.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product having a non-transitory processor-readable storage medium storing program code. The program code, when executed by a processor, causes the processor to perform and/or initiate at least a portion of the operations described herein. Examples of non-transitory processor-readable storage media include, but are not limited to, optical media, magnetic media, magneto-optical media, computer memory such as RAM, a bulk storage device, e.g., hard disk, or the like.

The flowcharts and block diagrams in the Figures illustrate the architecture, functionality, and operation of possible implementations of systems, methods, and computer program products according to various embodiments disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terms "computer program," "software," "application," "program code," "executable code," variants and/or combinations thereof, in the present context, mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, a source code, an object code, a shared library/dynamic load library and/or other sequence of instructions designed for execution on a computer system.

The corresponding structures, materials, acts, and equivalents of all means or step plus function elements in the claims below are intended to include any structure, material, or act for performing the function in combination with other claimed elements as specifically claimed.

One or more embodiments described within this disclosure may be embodied in other forms without departing from the spirit or essential attributes thereof. Accordingly, reference should be made to the following claims, rather than to the foregoing specification, as indicating the scope of the one or more embodiments.

What is claimed is:

1. A method of maintaining a point of interest data structure using wireless access point data, comprising:
   determining, using a processor, that a point of interest of a selected entry of a point of interest data structure has a point of interest name matching a network name of a wireless access point of an entry from a wireless access point data structure and that location of the point of interest is within a predetermined distance of a location of the wireless access point;
   wherein the wireless access point data structure is determined through receipt of messages from a plurality of wireless devices specifying wireless access point data, the network name is a service set identifier of the wireless access point, and the matching is performed based upon matching a string of the service set identifier with a string of the point of interest name; and
   responsive to the determining, updating, using the processor, the location of the point of interest of the selected entry with the location of the wireless access point.

2. The method of claim 1, further comprising:
   determining that a network name of a further wireless access point matches a chain in a chain data store, wherein the chain is an entity having a plurality of branches, wherein the branches are physical places.

3. The method of claim 2, wherein the determining that the network name of the further wireless access point matches the chain in the chain data store comprises:
   matching the network name of the further wireless access point with a chain name.

4. The method of claim 2, wherein the determining that the network name of the further wireless access point matches the chain in the chain data store comprises:
   matching the network name of the further wireless access point with a network name of a chain.

5. The method of claim 3, further comprising:
   responsive to determining that a location of the further wireless access point is not within a predetermined distance of a location of any branch of the matching chain, adding a new point of interest to the point of interest data structure;
   wherein the new point of interest specifies the location of the further wireless access point and a chain name of the matching chain representing a new branch of the chain.

6. The method of claim 2, further comprising:
   responsive to determining that a location of the further wireless access point is within a predetermined distance of a location of a branch of the matching chain and that an age of a newest record for the further wireless access point within the wireless access point data structure exceeds an age limit, removing the branch as a point of interest from the point of interest data structure.

7. The method of claim 1, further comprising:
   choosing among a plurality of entries in the wireless access point data structure for use in the determining based upon signal levels of the plurality of entries, wherein each of the plurality of entries specifies a same wireless access point.

8. A system for maintaining a point of interest data structure using wireless access point data, including:
   a memory configured to store instructions; and
   a processor configured to initiate operations in response to executing the instructions, the operations comprising:
   determining that a point of interest of a selected entry of a point of interest data structure has a point of interest name matching a network name of a wireless access point of an entry from a wireless access point data structure and that a location of the point of interest is within a predetermined distance of a location of the wireless access point;
   wherein the wireless access point data structure is determined through receipt of messages from a plurality of wireless devices specifying wireless access point data, the network name is a service set identifier of the wireless access point, and the matching is performed based upon matching a string of the service set identifier with a string of the point of interest name; and
   responsive to the determining, updating the location of the point of interest of the selected entry with the location of the wireless access point.

9. The system of claim 8, wherein the processor initiates operations further including:
   determining that a network name of a further wireless access point matches a chain in a chain data store, wherein the chain is an entity having a plurality of branches, wherein the branches are physical places.

10. The system of claim 9, wherein the determining that the network name of the further wireless access point matches the chain in the chain data store comprises:
    matching the network name of the further wireless access point with a chain name.

11. The system of claim 9, wherein the determining that the network name of the further wireless access point matches the chain in the chain data store comprises:
    matching the network name of the further wireless access point with a network name of a chain.

12. The system of claim 10, wherein the processor initiates operations further including:
    responsive to determining that a location of the further wireless access point is not within a predetermined distance of a location of any branch of the matching chain, adding a new point of interest to the point of interest data structure;

wherein the new point of interest specifies the location of the wireless access point and a chain name of the matching chain representing a new branch of the chain.

13. The system of claim 9, wherein the processor initiates operations further including:
responsive to determining that a location of the further wireless access point is within a predetermined distance of a location of a branch of the matching chain and that an age of a newest record for the further wireless access point within the wireless access point data structure exceeds an age limit, removing the branch as a point of interest from the point of interest data structure.

14. The system of claim 8, wherein the processor initiates operations further including:
choosing among a plurality of entries in the wireless access point data structure for use in the determining based upon signal levels of the plurality of entries, wherein each of the plurality of entries specifies a same wireless access point.

15. A non-transitory processor-readable storage medium that includes program code that, when executed by a processor, performs a method of maintaining a point of interest data structure using wireless access point data comprising:
determining that a point of interest of a selected entry of a point of interest data structure has a point of interest name matching a network name of a wireless access point of an entry from a wireless access point data structure and that a location of the point of interest is within a predetermined distance of a location of the wireless access point;
wherein the wireless access point data structure is determined through receipt of messages from a plurality of wireless devices specifying wireless access point data, the network name is a service set identifier of the wireless access point, and the matching is performed based upon matching a string of the service set identifier with a string of the point of interest name; and
responsive to the determining, updating the location of the point of interest of the selected entry with the location of the wireless access point.

16. The non-transitory processor-readable storage medium of claim 15, wherein the method further comprises:
determining that a network name of a further wireless access point matches a chain in a chain data store, wherein the chain is an entity having a plurality of branches, wherein the branches are physical places.

17. The non-transitory processor-readable storage medium of claim 16, wherein the determining that the network name of the further wireless access point matches the chain in the chain data store comprises:
matching the network name of the further wireless access point with a chain name; or
matching the network name of the further wireless access point with a network name of a chain.

18. The non-transitory processor-readable storage medium of claim 17, wherein the method further comprises:
responsive to determining that a location of the further wireless access point is not within a predetermined distance of a location of any branch of the matching chain, adding a new point of interest to the point of interest data structure;
wherein the new point of interest specifies the location of the further wireless access point and a chain name of the matching chain representing a new branch of the chain.

19. The non-transitory processor-readable storage medium of claim 16, wherein the method further comprises:
responsive to determining that a location of the further wireless access point is within a predetermined distance of a location of a branch of the matching chain and that an age of a newest record for the further wireless access point within the wireless access point data structure exceeds an age limit, removing the branch as a point of interest from the point of interest data structure.

20. The non-transitory processor-readable storage medium of claim 15, wherein the method further comprises:
choosing among a plurality of entries in the wireless access point data structure for use in the determining based upon signal levels of the plurality of entries, wherein each of the plurality of entries specifies a same wireless access point.

* * * * *